United States Patent
Malluru et al.

(10) Patent No.: US 10,693,664 B2
(45) Date of Patent: Jun. 23, 2020

(54) SYSTEMS AND METHODS TO BUILD A TRUSTED HYPERTEXT TRANSFER PROTOCOL SECURE SESSION ON A LIMITED PRE-BOOT BASIC INPUT/OUTPUT SYSTEM ENVIRONMENT

(71) Applicant: Dell Products L.P., Round Rock, TX (US)

(72) Inventors: Purushothama R. Malluru, Round Rock, TX (US); Christopher Channing Griffin, Cedar Park, TX (US); Chris Edward Pepper, Leander, TX (US); Ibrahim Sayyed, Georgetown, TX (US); Alok Pant, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 16/041,541

(22) Filed: Jul. 20, 2018

(65) Prior Publication Data

US 2020/0028696 A1 Jan. 23, 2020

(51) Int. Cl.
*H04L 29/06* (2006.01)
*H04L 9/32* (2006.01)
*G06F 21/33* (2013.01)
*G06F 21/57* (2013.01)
*H04L 29/08* (2006.01)

(52) U.S. Cl.
CPC ............ *H04L 9/3265* (2013.01); *G06F 21/33* (2013.01); *G06F 21/572* (2013.01); *G06F 21/575* (2013.01); *H04L 63/166* (2013.01); *H04L 67/02* (2013.01)

(58) Field of Classification Search
CPC ..... H04L 9/3265; H04L 63/166; H04L 67/02; G06F 21/33; G06F 21/57; G06F 21/572; G06F 21/575
See application file for complete search history.

(56) References Cited

U.S. PATENT DOCUMENTS

| 2009/0013393 A1* | 1/2009 | Xi ............................ G06F 21/31 726/7 |
| 2010/0178977 A1* | 7/2010 | Kim ......................... G06F 21/51 463/25 |
| 2015/0135299 A1* | 5/2015 | Liang ................... H04L 12/6418 726/10 |

* cited by examiner

*Primary Examiner* — Yogesh Paliwal
(74) *Attorney, Agent, or Firm* — Baker Botts L.L.P.

(57) ABSTRACT

Systems and methods to build a trusted HTTPS session on a limited pre-boot BIOS environment in an information handling system. The information handling system may include a BIOS that may be stored in a secure read-only region of a flash storage. The BIOS may download signed certification authority (CA) information from a server based on a target location that may be stored at the secure read-only region. The BIOS may authenticate the signed CA information based on a public key that may be stored at the secure read-only region. The BIOS may, when the signed CA information is authenticated, download a root CA chain from the server and authenticate the root CA chain. The BIOS may, when the root CA chain is authenticated, establish a secure encrypted transport layer security (TLS) session with the server based the root CA chain.

20 Claims, 3 Drawing Sheets

300 — METHOD TO BUILD A TRUSTED HTTPS SESSION ON A LIMITED PRE-BOOT BIOS ENVIRONMENT

302 — DOWNLOADING, BY A BIOS STORED IN A SECURE READ-ONLY REGION OF A FLASH STORAGE AND EXECUTABLE BY A PROCESSOR OF THE INFORMATION HANDLING SYSTEM, FIRST SIGNED CERTIFICATION AUTHORITY (CA) INFORMATION FROM A FIRST SERVER BASED ON A FIRST TARGET LOCATION STORED AT A SECURE READ-ONLY REGION OF THE FLASH STORAGE VIA A NETWORK

304 — AUTHENTICATING, BY THE BIOS, THE FIRST SIGNED CA INFORMATION BASED ON A FIRST PUBLIC KEY STORED AT THE SECURE READ-ONLY REGION OF THE FLASH STORAGE

306 — WHEN THE FIRST SIGNED CA INFORMATION IS AUTHENTICATED, DOWNLOADING, BY THE BIOS, A FIRST ROOT CA CHAIN FROM THE FIRST SERVER

308 — AUTHENTICATING, BY THE BIOS, THE FIRST ROOT CA CHAIN FROM THE FIRST SERVER BASED ON A FIRST ROOT CA CHAIN OF THE AUTHENTICATED FIRST SIGNED CA INFORMATION

310 — WHEN THE FIRST ROOT CA CHAIN FROM THE FIRST SERVER IS AUTHENTICATED, ESTABLISHING A FIRST SECURE ENCRYPTED TRANSPORT LAYER SECURITY (TLS) SESSION WITH THE FIRST SERVER BASED ON ONE OR MORE CERTIFICATES OF THE FIRST ROOT CA CHAIN FROM THE FIRST SERVER

FIG. 3

SYSTEMS AND METHODS TO BUILD A TRUSTED HYPERTEXT TRANSFER PROTOCOL SECURE SESSION ON A LIMITED PRE-BOOT BASIC INPUT/OUTPUT SYSTEM ENVIRONMENT

BACKGROUND

Field of the Disclosure

This disclosure relates generally to information handling systems and, more particularly, to systems and methods to build a trusted hypertext transfer protocol secure (HTTPS) session on a limited pre-boot basic input/output system (BIOS) environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed information handling system may include a basic input/output system (BIOS) that may be stored in a secure read-only region of a flash storage of the information handling system and executable by a processor of the information handling system. The BIOS may download first signed certification authority (CA) information from a first server based on a first target location that may be stored at the secure read-only region of the flash storage via a network. The BIOS may also authenticate the first signed CA information based on a first public key that may be stored at the secure read-only region of the flash storage. The BIOS may further, when the first signed CA information is authenticated, download a first root CA chain from the first server and authenticate the first root CA chain from the first server based on a first root CA chain of the authenticated first signed CA information. The BIOS may also, when the first root CA chain from the first server is authenticated, establish a first secure encrypted transport layer security (TLS) session with the first server based on one or more certificates of the first root CA chain from the first server.

In a number of the disclosed embodiments of the information handling system, the first server may, when an indicator received from the BIOS may indicate that the first signed CA information from the server failed authentication and has been compromised, replace the compromised first signed CA information of the server with new signed CA information.

In a number of the disclosed embodiments of the information handling system, the first server may, when an indicator received from the BIOS may indicate that the first root CA chain from the first server failed authentication and has been compromised, replace the compromised first signed CA information of the server with new signed CA information, and replace the compromised first root CA chain from the first server with a new root CA chain.

In a number of the disclosed embodiments of the information handling system, the BIOS may also, when at least one of the certificates of the first root CA chain from the server failed authentication and has been compromised, revoke the at least one of the certificates of the first root CA chain from the server that has been compromised.

In a number of the disclosed embodiments of the information handling system, authentication of the first signed CA information may further include authentication of the first root CA chain of the authenticated first signed CA information, authentication of a first target location of the authenticated first signed CA information, and authentication of a first digital signature of the authenticated first signed CA information used to sign the first signed CA information.

In a number of the disclosed embodiments of the information handling system, the BIOS may also download second signed CA information from a second server based on a second target location stored at the secure read-only region of the flash storage and authenticate the second signed CA information based on a second public key stored at the secure read-only region of the flash storage. The BIOS may further, when the second signed CA information is authenticated download a second root CA chain from the second server, authenticate the second root CA chain from the second server based on a second root CA chain of the authenticated second signed CA information, and when the second root CA chain from the second server is authenticated, establish a second secure encrypted TLS session with the second server based on one or more certificates of the second root CA chain from the second server.

In a number of the disclosed embodiments of the information handling system, the authenticated first signed CA information may have been signed using a first digital signature based on the first public key.

In a number of the disclosed embodiments of the information handling system, the authenticated first signed CA information may have been signed using a third digital signature based on a third public key. The authenticated first signed CA information may include the third digital signature, the third public key and the first target location signed with a first digital signature based on the first public key using an extended signing mechanism, the first digital signature, and the first root CA chain.

In a number of the disclosed embodiments of the information handling system, the first target location may comprise a server uniform resource locator (URL).

In a number of the disclosed embodiments of the information handling system, the flash storage may comprise a serial peripheral interface bus (SPI) flash storage.

In a second embodiment, a disclosed method may include downloading, by a basic input/output system (BIOS) stored in a secure read-only region of a flash storage of the information handling system and executable by a processor of the information handling system, first signed certification authority (CA) information from a first server based on a first target location stored at a secure read-only region of the flash storage via a network. The method may also include authenticating, by the BIOS, the first signed CA information based on a first public key stored at the secure read-only region of the flash storage. The method may further include, when the first signed CA information is authenticated, downloading, by the BIOS, a first root CA chain from the first server and authenticating, by the BIOS, the first root CA chain from the first server based on a first root CA chain of the authenticated first signed CA information. The method may also, when the first root CA chain from the first server is authenticated, establishing a first secure encrypted transport layer security (TLS) session with the first server based on one or more certificates of the first root CA chain from the first server.

In a number of the disclosed embodiments of the method, the method may also include, when an indicator received from the BIOS may indicate that the first signed CA information from the server failed authentication and has been compromised, replacing, by the first server, the compromised first signed CA information of the server with new signed CA information.

In a number of the disclosed embodiments of the method, the method may also include, when an indicator received from the BIOS may indicate that the first root CA chain from the first server failed authentication and has been compromised, replacing, by the first server, the compromised first signed CA information of the server with new signed CA information, and replacing, by the first server, the compromised first root CA chain from the first server with a new root CA chain.

In a number of the disclosed embodiments of the method, the method may also include, when at least one of the certificates of the first root CA chain from the server may have failed authentication and may have been compromised, revoking the at least one of the certificates of the first root CA chain from the server that has been compromised.

In a number of the disclosed embodiments of the method, authenticating the first signed CA information may further include authenticating of the first root CA chain of the authenticated first signed CA information, authenticating of a first target location of the authenticated first signed CA information, and authenticating of a first digital signature of the authenticated first signed CA information used to sign the first signed CA information.

In a number of the disclosed embodiments of the method, the method may also include downloading second signed CA information from a second server based on a second target location stored at the secure read-only region of the flash storage and authenticating the second signed CA information based on a second public key stored at the secure read-only region of the flash storage. The method may further include, when the second signed CA information is authenticated, downloading a second root CA chain from the second server, authenticating the second root CA chain from the second server based on a second root CA chain of the authenticated second signed CA information, and when the second root CA chain from the second server is authenticated, establishing a second secure encrypted TLS session with the second server based on one or more certificates of the second root CA chain from the second server.

In a number of the disclosed embodiments of the method, the authenticated first signed CA information may have been signed using a first digital signature based on the first public key.

In a number of the disclosed embodiments of the method, the authenticated first signed CA information may have been signed using a third digital signature based on a third public key. The authenticated first signed CA information may include the third digital signature, the third public key and the first target location signed with a first digital signature based on the first public key using an extended signing mechanism, the first digital signature, and the first root CA chain.

In a number of the disclosed embodiments of the method, the first target location may comprise a server uniform resource locator (URL).

In a number of the disclosed embodiments of the method, the flash storage may comprise a serial peripheral interface bus (SPI) flash storage.

BRIEF DESCRIPTION OF THE DRAWINGS

For a more complete understanding of the present invention and its features and advantages, reference is now made to the following description, taken in conjunction with the accompanying drawings, in which:

FIG. 3 is a flowchart depicting selected elements of an embodiment of a method to build a trusted hypertext transfer protocol secure (HTTPS) session on a limited pre-boot BIOS environment.

DESCRIPTION OF PARTICULAR EMBODIMENT(S)

Figure 1:
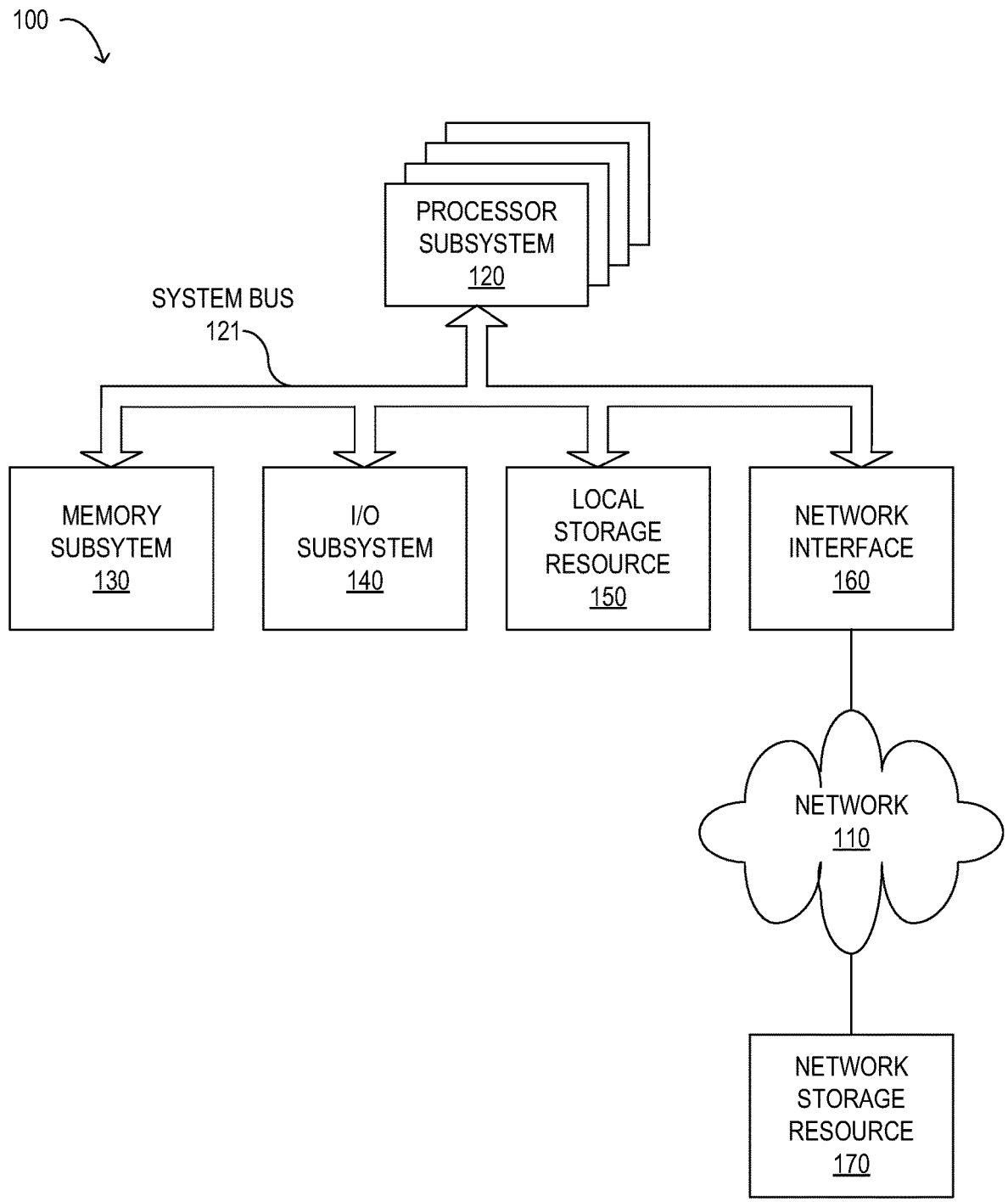
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
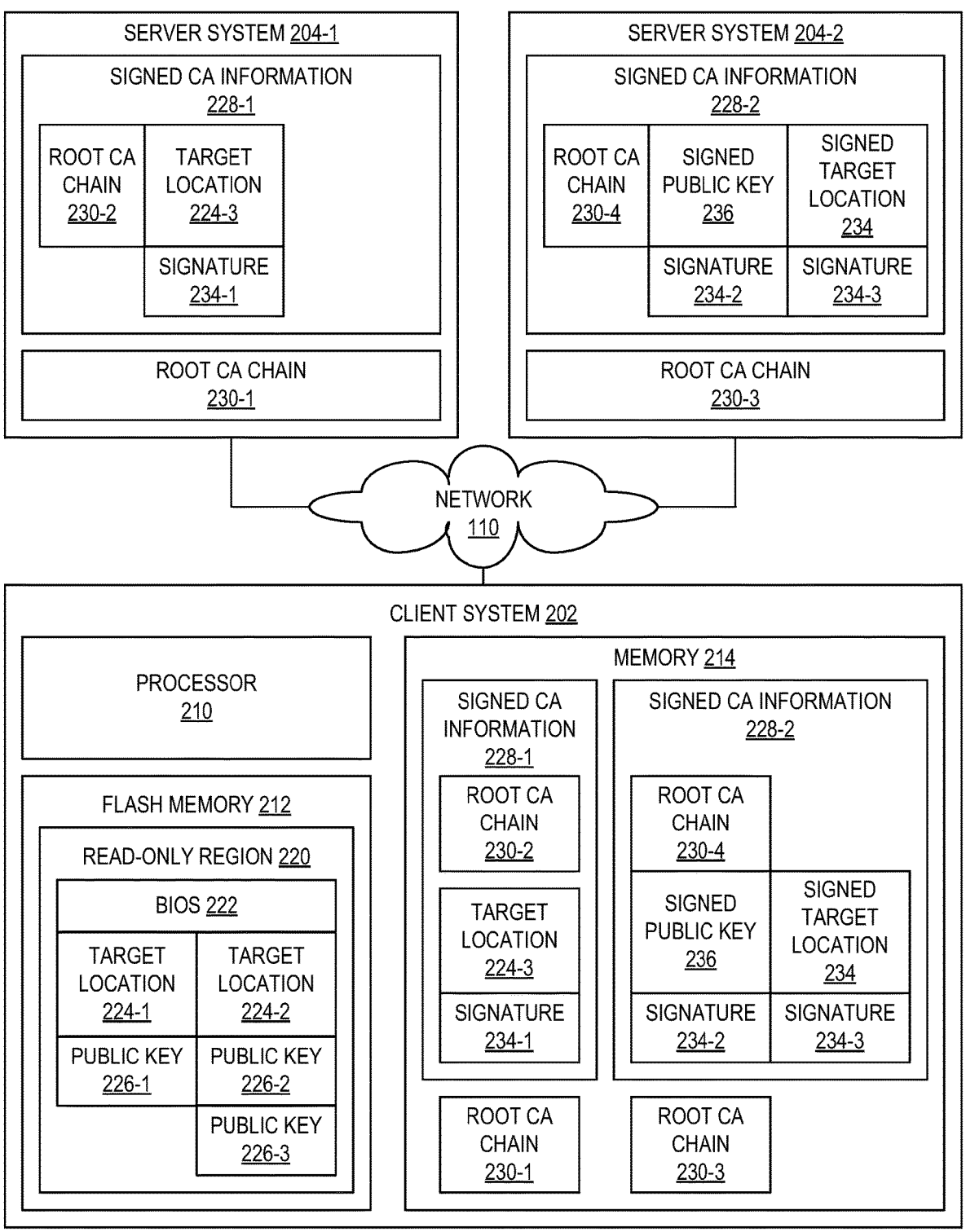
FIG. 2 is a block diagram of selected elements of an embodiment of an exemplary basic input/output system (BIOS) services system for building trusted hypertext transfer protocol secure (HTTPS) sessions on a limited pre-boot BIOS environment.

Particular embodiments are best understood by reference to FIGS. 1, 2 and 3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP)

address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

A client system may provide pre-boot network capabilities including recovery, diagnostic, operating system (OS) deployment, or other network capabilities. A typical client system such as a laptop or a desktop client system may provide these network capability using trusted hypertext transfer protocol sessions (HTTPs) based basic input/output system (BIOS) services. These HTTPs sessions utilize Certification Authority (CA) certificates to establish trust between a server and a client using a session key for a secure transport layer security (TLS) tunnel between the client and the server for secure communication for data exchange. These CA certificates are stored in a serial peripheral interface bus (SPI) flash memory in a tamper resistant (code area) space. However, there is significant overhead in managing a root CA chain and the CA certificates of the root CA chain within in the tamper resistant space. One problem is that only a small number of certificates of the root CA chain may fit within the tamper resistant space. Another problem is that there is not a good way to handle CA revocation in the tamper resistant space if one or more of the certification of the root CA chain are compromised. In addition, in an environment where there are a large number of distributed client systems being managed by a management system, any update of the one or more CA certificates that have been compromised will require updating every client system with new uncompromised CA certificates of the root CA chain. In distributed client systems, storing CA certificates in a secure unified extensible firmware interface (UEFI) BIOS variable or in other SPI flash storage space, presents various challenges in terms of the provision of the client systems, a very limited tamper resistant space within a flash storage of the client systems for CA certificates, and revocation of compromised CA certificates of each client system. In these systems, the inherent challenge of managing the CA certificates on distributed client systems may require a BIOS flash update on each distributed client system or may require special tools to manage the update of CA certificates on the distributed client systems after their deployment. In some client systems, the CA information is stored in the BIOS flash and the update requires a BIOS flash update.

As will be described in further detail herein, the inventors of the present disclosure have discovered systems and methods for building trusted hypertext transfer protocol secure (HTTPS) sessions on a limited pre-boot basic input/output system (BIOS) environment. In a BIOS services system, a customer or a system administrator of a server system may build a CA information file that may include a root CA chain of CA certificates and a target address which may be a uniform resource locator (URL) that a client system may use to access document and other resources of the server system. The CA information file may be signed directly or using an extended signing mechanism based on a public key. The CA information file may also include the signature. A client system of the BIOS services system may have been provisioned to store the public key and the target location in a tamper resistant secure read-only region of a flash storage of the client system. During a pre-boot session of the client system, the BIOS may initiate an unsecured HTTP session with the server system using the target location stored in the read-only region of the flash storage. The BIOS may download the CA information file from the server system and perform authentication of the CA information file based on the public key stored in the read-only region of the flash storage. When the CA information file has been authenticated, the BIOS may download a root CA chain from the server system. The BIOS may authenticate the downloaded root CA chain against the root CA chain of the authenticated CA information file. When the downloaded root CA chain has been authenticated, the BIOS may trust the root CA chain. The BIOS may build a secure TLS session based on the certificates of the trusted root CA chain which may be used to exchange the secure information, data, and files between the client system and the server system. At any time, the CA is compromised, the server system may update the compromised root CA chain with a new uncompromised root CA chain and update the CA information file with a new uncompromised CA information file. As the public key and the target location are stored in the read-only region of the flash storage, there is no need to update either the read-only region of the flash storage or perform a flash storage update. In this manner, the BIOS services system may support a customized root CA chain for each customer and may reduce the amount of storage space required in the secure read-only region of the flash storage or other region of the flash storage by eliminating or reducing the need to store CA certificates in this storage space. This solution also provides a simple way to handle CA revocations and updates. There are no stale CA certificates. The solution also provides seamless CA revocation on compromised systems without requiring an update on every distributed client system. The management of the CA certificates is managed in the back-end server systems in a centralized manner instead of by each of the distributed client systems.

Turning now to FIG. 2, a block diagram depicting selected elements of an embodiment of an exemplary basic input/output system (BIOS) services system 200 for building trusted hypertext transfer protocol secure (HTTPS) sessions on a limited pre-boot BIOS environment. As shown in FIG. 2, components of BIOS services system 200 may include, but are not limited to, a client system 202, server systems 204 including server systems 204-1 and 204-2, and network 110. Each of client system 202, server system 204-1 and server system 204-2 may be an information handling system 100 and may be coupled to each other via network 110.

Client system 202 may include a processor 210, a flash memory 212, and a memory 214. Flash memory 212 may comprise a serial peripheral interface bus (SPI) flash storage, a flash memory, a solid-state flash memory, or another type of flash memory as previously described with reference to FIG. 1. Flash memory 212 may include a secure read-only memory region 220, which may be a secure tamper resistant read-only memory region 220. Client system 202 may also include a BIOS 222, a target location 224-1, a target location 224-2, a public key 226-1, a public key 226-2, and a public key 226-3 which may all be stored in secure read-only memory region 220 of flash memory 212. BIOS 222 may comprise firmware executable by processor 210 for performing various tasks including utilizing network capabilities for system recovery, diagnostics, operating system (OS) deployment, and other types of network capabilities and tasks during the booting process and power-on startup. Each target location 224 may be a uniform resource locator (URL) which client system 202 may use as the global address of documents or other resources of a server system 204 on the World Wide Web (WWW). Target location 224-1 may be the global address of resources of server system 204-1. Similarly, target location 224-2 may be the global address of resources of server system 204-2. Each public key 226 may be the public key of a public/private key pair used in asymmetric cryptography for encryption and decryption of information communicated between client system 202 and a server system 204 associated with each public key 226.

Memory 214 may include signed certification authority (CA) information 228-1, signed CA information 228-2, a root CA chain 230-1, and a root CA chain 230-3. Signed CA information 228 may be a metafile comprising information described in an extensible markup language (XML), in JavaScript object notation (JSON), or another type of markup language of object notation. Information of the signed CA information 228 may include a root CA chain 230 comprising one or more signed CA certificates and a target location 224 of this root CA chain 230. CA information 228 and each CA certificate of the root CA chain 230 may be signed using a public key 226 to establish the trust chain of CA information 228 and the root CA chain 230. Signed CA information 228-1 may include a root CA chain 230-2, a target location 224-3, and a signature 234-1.

In one or more embodiments, an extended signing mechanism may be used to sign the CA information 228 and each CA certificate of the root CA chain 230. When the extended signing mechanism is utilized, a first administrator of the server system 204 may sign the CA information 228 and each CA certificate of the root CA chain 230 associated with the server system 204 using a first public key 226. A second administrator of client system 202 may sign the public portion of the first public key 226 and the target location 224 of the root CA chain 230 using a second public key 226 to extend the trust chain of CA information 228 and the root CA chain 230. This extended signing mechanism ensures that if the private key of the public/private key pair of the first public key 226 is compromised, client system 202 is not compromised. For example, the first administrator of the server system 204 can mitigate the security compromise by blocking the target location 224 so that any other client system 202 is not compromised. Client system 202 may utilize this extended signing mechanism for authorization so that it will not utilize the target location 224 or become compromised by any other means. Signed CA information 228-2 may include a root CA chain 230-4, a signed public key 236, a signed target location 234, a signature 234-2 and a signature 234-3. Signed CA information 228-2 is signed using the extended signing mechanism.

During operation, an administrator of server system 204-1 may build root CA chain 230-1 by signing each of the one or more certificates of root CA chain 230-1 using public key 226-1 to establish the trust chain of root CA chain 230-1. The administrator of server system 204-1 may also build signed CA information 228-1 including root CA chain 230-2, target location 224-3, and signature 234-1 using a language or notation such as XML or JSON. The administrator may sign CA information 228-1 using signature 234-1 based on public key 226-1. The administrator may copy Root CA chain 230-1 to root CA chain 230-2 of signed CA information 228-1, add the target location such as the URL of signed CA information 228-1, root CA chain 230-1, and other information at target location 224-3 of signed CA information 228-1, and add signature 234-1 to signed CA information 228-1.

Similarly, during operation, a first administrator of server system 204-2 may build root CA chain 230-3 by signing, using the extended signing mechanism, each of the one or more certificates of root CA chain 230-3 using signature 234-2 based on public key 226-2 to establish the trust chain of root CA chain 230-3. The first administrator of server system 204-1 may also build signed CA information 228-2 including root CA chain 230-4, signed target location 234, signed public key 236, signature 234-2, and signature 234-3. The first administrator may sign CA information 228-2 using signature 234-2 based on public key 226-2. A second administrator of client system 202 may sign the target location such as the URL of signed CA information 228-2, root CA chain 230-3, and other information using signature 234-3 based on public key 226-3 to generate signed target location 234. The second administrator may also sign the public portion of public key 226-2 using signature 234-3 based on public key 226-3 to generate signed public key 236. The first administrator may copy Root CA chain 230-3 to root CA chain 230-4 of signed CA information 228-2, add signed target location 234 to signed CA information 228-2, add signed public key 236 to signed CA information 228-2, add signature 234-2 to signed CA information 228-2, and add signature 234-3 to signed CA information 228-2. By utilizing the extended signing mechanism, the trust chain of root CA chain 230-3 is extended by signature 234-3.

During a provisioning process of flash memory 212, BIOS 222, target location 224-1, target location 224-2, public key 226-1, public key 226-2, and public key 226-3 may have been stored at secure read-only region 220 of flash memory 212. During operation of client system 202, BIOS 222 may download signed CA information 228-1 from server system 204-1 based on target location 224-1 that may be stored at secure read-only region 220 via network 110. When the download is complete, BIOS 222 may store signed CA information 228-1 from server system 204-1 at signed CA information 228-1 of memory 214. BIOS 222 may authenticate signed CA information 228-1 at memory 214 based on public key 226-1 that may be stored at the secure read-only region 220. Authentication of signed CA information 228-1 may include BIOS 222 authenticating each one of the one or more CA certificates of root CA chain 230-2 based on public key 226-1. Authentication of signed CA information 228-1 may also include BIOS 222 authenticating target location 224-3 by determining if target location 224-3 of signed CA information 228-1 matches target location 224-1 of secure read-only region 222. Authentication of signed CA information 228-1 may also include BIOS 222 authenticating signature 234-1 used to sign signed CA information 228-1.

When signed CA information 228-1 failed authentication and has been compromised, client system 202 may send an indicator that indicates that signed CA information 228-1 failed authentication and has been compromised to server system 204-1 so that server system 204-1 may take corrective action. When server system 204-1 receives the indicator that indicates that signed CA information 228-1 failed authentication and has been compromised, server system 204-1 may generate and re-build new uncompromised signed CA information 228 as previously described. Server system 204-1 may replace the compromised signed CA information 228-1 with the new uncompromised signed CA information 228. By re-building the new uncompromised signed CA information 228, server system 204-1 re-establishes the trust chain.

When signed CA information 228-1 is authenticated, BIOS 222 may download root CA chain 230-1 from server system 204-1. When the download is complete, BIOS 222 may store root CA chain 230-1 from server system 204-1 at root CA chain 230-1 of memory 214. BIOS 222 may authenticate root CA chain 230-1 based on root CA chain 230-2 of the authenticated signed CA information 228-1. When root CA chain 230-1 is authenticated, BIOS 222 may establish a first secure transport layer security (TLS) session with server system 204-1 based on one or more certificates of root CA chain 230-1 of the authenticated root CA chain 230-1. Once the first secure TLS session has been established, BIOS 222 and server system 204-1 may utilize the first secure TLS session to exchange secure information and send and receive files and data between each other.

When root CA chain 230-1 failed authentication and has been compromised, BIOS 222 of client system 202 may send an indicator that indicates that root CA chain 230-1 failed authentication and has been compromised to server system 204-1 so that server system 204-1 may take corrective action. When server system 204-1 receives the indicator that indicates that root CA chain 230-1 failed authentication and has been compromised from BIOS 222, server system 204-1 may generate and re-build new uncompromised signed CA information 228 as previously described. Server system 204-1 may replace the compromised signed CA information 228-1 with the new uncompromised signed CA information 228. Server system 204-1 may also generate and re-build new uncompromised root CA chain 230 as described above. Re-building the new root CA chain 230 may also including generating one or more new certificates of the new root CA chain 230 to replace the corresponding one or more compromised certificates of root CA chain 230-1. By re-building the new uncompromised signed CA information 228 and the new uncompromised root CA chain 230, server system 204-1 re-establishes the trust chain.

In one or more embodiments, when at least one of the certificates of root CA chain 230-1 failed authentication and has been compromised, client system 202 may revoke the at least one of the certificates of root CA chain 230-1 that has been compromised so that client system 202 is not compromised. In one or more embodiments, BIOS services system 200 may also include one or more other client systems 202 and a management system (not shown in FIG. 2). The management system may monitor each of the client systems 202 to determine which ones may have been compromised. The management system may then revoke the root CA chain 230-1 that has been compromised on the compromised client systems 202 and cause each of the compromised client systems 202 to be updated with the new uncompromised signed CA information 228 and the new uncompromised root CA chain 230 to re-establish the trust chain. By updating only, the compromised client systems 202, the management system does not have to require that every client system 202 be updated.

Client system 202 may download signed CA information 228-2 from server system 204-2 based on target location 224-2 via network 110. When the download is complete, BIOS 222 may store signed CA information 228-2 from server system 204-2 at signed CA information 228-2 of memory 214. BIOS 222 may determine that signed CA information 228-2 was signed using the extended signing mechanism. When signed CA information 228-2 was signed using the extended signing mechanism, BIOS 222 may authenticate signed CA information 228-2 using signature 234-2 based on public key 226-2 stored at secure read-only region 220 of flash memory 212. Authentication of signed CA information 228-2 may also include BIOS 222 authenticating signed public key 236 by determining that signed public key 236 was generated by signing the public portion of public key 226-2 using signature 234-3 based on public key 226-3. Authentication of signed CA information 228-2 may also include BIOS 222 authenticating that signed target location 234 was generated by signing target location 224-2 using signature 234-3 based on public key 226-3. Authentication of signed CA information 228-2 may also include BIOS 222 authenticating each one of the one or more CA certificates of root CA chain 230-4 using signature 234-2 based on public key 226-2.

When signed CA information 228-2 is authenticated, BIOS 222 may download root CA chain 230-3 from server system 204-2. When the download is complete, BIOS 222 may store root CA chain 230-3 from server system 204-2 at root CA chain 230-3 of memory 214. BIOS 222 may authenticate root CA chain 230-3 based on root CA chain 230-4 of the authenticated signed CA information 228-2. When root CA chain 230-3 has been authenticated, the chain of trust has been extended to root CA chain 230-3. Once the chain of trust has been extended, BIOS 222 may establish a first secure transport layer security (TLS) session with server system 204-2 based on one or more certificates of root CA chain 230-3 of the authenticated root CA chain 230-3. Once the first secure TLS session has been established, BIOS 222 and server system 204-2 may utilize the first secure TLS session to exchange secure information and send and receive files and data between BIOS 222 and server system 204-2 in addition to BIOS 222 exchanging information and files and data with server system 204-1.

In one or more embodiments, BIOS 222 may establish a respective secure TLS session with each of one or more server systems 204 based on signed CA information 228 and a root CA chain 230 associated with each server system 204, as previously described. In one or more embodiments, anytime signed CA information 228 or one or more certifications of a root CA chain 230 is compromised, the corresponding server system 204 may update the one or more compromised certifications with respective one or more new uncompromised certificates of the root CA chain 230 and update the compromised signed CA information 228 with a new uncompromised signed CA information 228. Utilizing the above process, the one or more target locations 224 and public keys 226 stored at the secure read-only region 220 of flash memory 212 may not be compromised and there is no need to update them to maintain the security of the client system 202.

FIG. 3 is a flowchart depicting selected elements of an embodiment of a method to build a trusted HTTPS session on a limited pre-boot BIOS environment. Method 300 may be performed by information handling system 100, trusted BIOS services system 200, previously described with reference to FIGS. 1 and 2, or another information handling system. It is noted that certain operations described in method 300 may be optional or may be rearranged in different embodiments.

Method 300 may begin at step 302, by downloading, by a basic input/output system (BIOS) stored in a secure read-only region of a flash storage of the information handling system and executable by a processor of the information handling system, first signed certification authority (CA) information from a first server based on a first target location stored at a secure read-only region of the flash storage via a network. At step 304, authenticating, by the BIOS, the first signed CA information based on a first public key stored at the secure read-only region of the flash storage. At step 306, when the first signed CA information is authenticated, downloading, by the BIOS, a first root CA chain from the first server. At step 308, authenticating, by the BIOS, the first root CA chain from the first server based on a first root CA chain of the authenticated first signed CA information. At step 310, when the first root CA chain from the first server is authenticated, establishing a first secure encrypted transport layer security (TLS) session with the first server based on one or more certificates of the first root CA chain from the first server.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system (IHS), comprising:
   a processor;
   a flash storage including a secure read-only region; and
   a basic input/output system (BIOS) stored in the secure read-only region of the flash storage and executable by the processor, the BIOS configured to:
      download first signed certification authority (CA) information from a first server based on a first target location stored at the secure read-only region of the flash storage via a network;
      authenticate the first signed CA information based on a first public key stored at the secure read-only region of the flash storage; and
      when the first signed CA information is authenticated:
         download a first root CA chain from the first server;
         authenticate the first root CA chain from the first server based on a first root CA chain of the authenticated first signed CA information; and
         when the first root CA chain from the first server is authenticated, establish a first secure encrypted transport layer security (TLS) session with the first server based on one or more certificates of the first root CA chain from the first server.

2. The information handling system of claim 1, wherein the first server configured to:
   when an indicator received from the BIOS indicates that the first signed CA information from the server failed authentication and has been compromised, replace the compromised first signed CA information of the server with new signed CA information.

3. The information handling system of claim 1, wherein the first server configured to:
   when an indicator received from the BIOS indicates that the first root CA chain from the first server failed authentication and has been compromised:
      replace the compromised first signed CA information of the server with new signed CA information; and
      replace the compromised first root CA chain from the first server with a new root CA chain.

4. The information handling system of claim 1, wherein the BIOS further configured to:
   when at least one of the certificates of the first root CA chain from the server failed authentication and has been compromised, revoke the at least one of the certificates of the first root CA chain from the server that has been compromised.

5. The information handling system of claim 1, wherein authentication of the first signed CA information further comprises:
   authentication of the first root CA chain of the authenticated first signed CA information;
   authentication of a first target location of the authenticated first signed CA information; and
   authentication of a first digital signature of the authenticated first signed CA information used to sign the first signed CA information.

6. The information handling system of claim 1, wherein the BIOS further configured to:
   download second signed CA information from a second server based on a second target location stored at the secure read-only region of the flash storage;
   authenticate the second signed CA information based on a second public key stored at the secure read-only region of the flash storage; and
   when the second signed CA information is authenticated:
      download a second root CA chain from the second server;
      authenticate the second root CA chain from the second server based on a second root CA chain of the authenticated second signed CA information; and
      when the second root CA chain from the second server is authenticated, establish a second secure encrypted TLS session with the second server based on one or more certificates of the second root CA chain from the second server.

7. The information handling system of claim 1, wherein the authenticated first signed CA information was signed using a first digital signature based on the first public key.

8. The information handling system of claim 1, wherein the authenticated first signed CA information was signed using a third digital signature based on a third public key, and wherein the authenticated first signed CA information comprises:
   the third digital signature;
   the third public key and the first target location signed with a first digital signature based on the first public key using an extended signing mechanism;
   the first digital signature; and
   the first root CA chain.

9. The information handling system of claim 1, wherein the first target location comprises a server uniform resource locator (URL).

10. The information handling system of claim 1, wherein the flash storage comprises a serial peripheral interface bus (SPI) flash storage.

11. A method, comprising:
  downloading, by a basic input/output system (BIOS) stored in a secure read-only region of a flash storage of the information handling system and executable by a processor of the information handling system, first signed certification authority (CA) information from a first server based on a first target location stored at a secure read-only region of the flash storage via a network;
  authenticating, by the BIOS, the first signed CA information based on a first public key stored at the secure read-only region of the flash storage; and
  when the first signed CA information is authenticated:
    downloading, by the BIOS, a first root CA chain from the first server;
    authenticating, by the BIOS, the first root CA chain from the first server based on a first root CA chain of the authenticated first signed CA information; and
    when the first root CA chain from the first server is authenticated, establishing a first secure encrypted transport layer security (TLS) session with the first server based on one or more certificates of the first root CA chain from the first server.

12. The method of claim 11, wherein the method further comprising:
  when an indicator received from the BIOS indicates that the first signed CA information from the server failed authentication and has been compromised, replacing, by the first server, the compromised first signed CA information of the server with new signed CA information.

13. The method of claim 11, wherein the method further comprising:
  when an indicator received from the BIOS indicates that the first root CA chain from the first server failed authentication and has been compromised:
    replacing, by the first server, the compromised first signed CA information of the server with new signed CA information; and
    replacing, by the first server, the compromised first root CA chain from the first server with a new root CA chain.

14. The method of claim 11, wherein the further comprising:
  when at least one of the certificates of the first root CA chain from the server failed authentication and has been compromised, revoking the at least one of the certificates of the first root CA chain from the server that has been compromised.

15. The method of claim 11, wherein authenticating the first signed CA information further comprises:
  authenticating of the first root CA chain of the authenticated first signed CA information;
  authenticating of a first target location of the authenticated first signed CA information; and
  authenticating of a first digital signature of the authenticated first signed CA information used to sign the first signed CA information.

16. The method of claim 11, wherein the method further comprising:
  downloading second signed CA information from a second server based on a second target location stored at the secure read-only region of the flash storage;
  authenticating the second signed CA information based on a second public key stored at the secure read-only region of the flash storage; and
  when the second signed CA information is authenticated:
    downloading a second root CA chain from the second server;
    authenticating the second root CA chain from the second server based on a second root CA chain of the authenticated second signed CA information; and
    when the second root CA chain from the second server is authenticated, establishing a second secure encrypted TLS session with the second server based on one or more certificates of the second root CA chain from the second server.

17. The method of claim 11, wherein the authenticated first signed CA information was signed using a first digital signature based on the first public key.

18. The method of claim 11, wherein the authenticated first signed CA information was signed using a third digital signature based on a third public key, and wherein the authenticated first signed CA information comprises:
  the third digital signature;
  the third public key and the first target location signed with a first digital signature based on the first public key using an extended signing mechanism;
  the first digital signature; and
  the first root CA chain.

19. The method of claim 11, wherein the first target location comprises a server uniform resource locator (URL).

20. The method of claim 11, wherein the flash storage comprises a serial peripheral interface bus (SPI) flash storage.

* * * * *